US010863581B2

(12) United States Patent
Sturek

(10) Patent No.: US 10,863,581 B2
(45) Date of Patent: *Dec. 8, 2020

(54) METHOD AND SYSTEM FOR COMMUNICATING BETWEEN PRIVATE MESH NETWORK AND PUBLIC NETWORK

(71) Applicant: ITRON NETWORKED SOLUTIONS, INC., San Jose, CA (US)

(72) Inventor: Donald Eugene Sturek, El Cajon, CA (US)

(73) Assignee: ITRON NETWORKED SOLUTIONS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,552

(22) Filed: May 31, 2019

(65) Prior Publication Data
US 2019/0289667 A1 Sep. 19, 2019

Related U.S. Application Data

(63) Continuation of application No. 15/914,497, filed on Mar. 7, 2018, now Pat. No. 10,362,633.
(Continued)

(51) Int. Cl.
*H04W 84/12* (2009.01)
*H04W 84/04* (2009.01)
(Continued)

(52) U.S. Cl.
CPC ............. *H04W 84/12* (2013.01); *H04L 61/20* (2013.01); *H04W 84/047* (2013.01);
(Continued)

(58) Field of Classification Search
None
See application file for complete search history.

(56) References Cited

U.S. PATENT DOCUMENTS 8,599,814 B1  12/2013  Vleugels et al.
9,385,953 B1   7/2016  Hui et al.
(Continued)

OTHER PUBLICATIONS

Notice of Allowance dated Mar. 5, 2019, for U.S. Appl. No. 15/914,497, 16 pages.
(Continued)

*Primary Examiner* — Charles C Jiang
*Assistant Examiner* — Saad Khawar

(57) ABSTRACT

A network node (MR/BR node) is configured as a mesh router node in a first wireless network comprised of a plurality of first nodes and as a border router node in a second wireless network comprised of a plurality of second nodes, the second wireless network distinct from the first wireless network. The MR/BR node has a unique first address in the first wireless network and a unique second address in the second wireless network. In this way, the MR/BR node can receive a first communication in the first wireless network via the first address, and transmit the received first communication to at least one of the second nodes in the second wireless network. The MR/BR node can also receive a second communication in the second wireless network via the second address, and transmit the received second communication to at least one of the first nodes in the first wireless network.

21 Claims, 13 Drawing Sheets

Related U.S. Application Data

(60) Provisional application No. 62/535,321, filed on Jul. 21, 2017.

(51) Int. Cl.
*H04L 29/12* (2006.01)
*H04W 84/18* (2009.01)
*H04W 24/02* (2009.01)
*H04W 92/02* (2009.01)

(52) U.S. Cl.
CPC ...... *H04L 61/2007* (2013.01); *H04L 61/6004* (2013.01); *H04L 61/6022* (2013.01); *H04L 61/6081* (2013.01); *H04W 24/02* (2013.01); *H04W 84/18* (2013.01); *H04W 92/02* (2013.01)

(56) References Cited

U.S. PATENT DOCUMENTS

| | | | |
|---|---|---|---|
| 10,362,633 B2* | 7/2019 | Sturek | H04W 84/047 |
| 2004/0081152 A1 | 4/2004 | Thubert et al. | |
| 2006/0133341 A1 | 6/2006 | Chari et al. | |
| 2007/0025246 A1 | 2/2007 | Pirzada et al. | |
| 2007/0030832 A1* | 2/2007 | Gonia | H04L 12/28 370/338 |
| 2010/0177708 A1 | 7/2010 | Pandey et al. | |
| 2010/0246554 A1 | 9/2010 | Alapuranen et al. | |
| 2011/0026500 A1 | 2/2011 | Shaffer et al. | |
| 2012/0134257 A1 | 5/2012 | Knox | |
| 2014/0254572 A1 | 9/2014 | Zuniga et al. | |
| 2015/0372875 A1* | 12/2015 | Turon | H04L 63/10 370/254 |
| 2016/0013972 A1 | 1/2016 | Morris | |
| 2016/0150459 A1* | 5/2016 | Patil | H04W 40/02 370/328 |
| 2018/0131532 A1 | 5/2018 | Wijnands et al. | |

OTHER PUBLICATIONS

PCT International Search Report and Written Opinion dated Sep. 26, 2018, for PCT International Application No. PCT/US2018/042871, 7 pages.

* cited by examiner

METHOD AND SYSTEM FOR COMMUNICATING BETWEEN PRIVATE MESH NETWORK AND PUBLIC NETWORK

RELATED APPLICATIONS

This application is a continuation of U.S. patent application Ser. No. 15/914,497, entitled "Method and System for Communicating Between Private Mesh Network and Public Network," filed Mar. 7, 2018, which claims priority under 35 U.S.C. § 119(e) to U.S. Provisional Patent Application No. 62/535,321, filed on Jul. 21, 2017, both of which are incorporated herein by reference in their entireties.

FIELD

The present disclosure relates to a method and system for enabling communication between a private mesh network and a public network.

BACKGROUND

A mesh network is a network topology in which nodes of the network can relay data for other nodes of the network. An example of a wireless mesh network is an advanced meter infrastructure (AMI) system for collecting data from utility meters (e.g., electricity, gas, water, etc.) or other community service devices (e.g., street lights, traffic signs, etc.), reporting the collected data to a back office system, and communicating data between the meters or devices and the back office system. The back office system can be located in one location or can be distributed across multiple locations. In such an AMI system, the meters or public utility devices each have a computer processor and transceiver (e.g., network interface card (NIC)) for communicating data between the meters or community service devices and other nodes of the network. Hereinafter, the meters or community service devices equipped with a processor and transceiver are collectively referred to as mesh network nodes. The mesh network nodes may transmit data to access points (also referred to as gateways) which serve as an interface between a local area network (LAN) composed of mesh network nodes, and a separate network through which the access point(s) is/are connected to the back office system. The access points may communicate with the back office system using a public network, such as a wide area network (WAN) (e.g., a cellular network). The access points are mesh network nodes because they are part of the LAN. The access points are also members of the WAN because the access points serve as interfaces between the LAN and WAN.

The LAN in which the mesh network nodes and access points are members may be a private network, to which access is restricted to approved network nodes and/or mesh network nodes that have the necessary credentials to be considered as approved network nodes when communicating in the private network. There may be a desire, however, to provide greater flexibility so that nodes in the public network may communicate with nodes in the private network. For example, Wi-SUN is a global industry alliance promoting interoperable wireless networking standards. There may be a desire for a node in one public network such as a WAN to communicate with mesh network nodes in a private LAN.

SUMMARY

An exemplary embodiment of the present disclosure provides a wireless communication system for communicating between wireless networks. The exemplary wireless communication system includes a first wireless network having a plurality of first nodes configured to communicate with each other over the first wireless network, where each of the plurality of first nodes in the first wireless network has a respectively unique first address in the first wireless network. The exemplary wireless communication system also includes a second wireless network having a plurality of second nodes configured to communicate with each other over the second wireless network, the second wireless network being distinct from the first wireless network, where each of the plurality of second nodes in the second wireless network has a respectively unique second address in the second wireless network. In addition, the exemplary wireless communication system includes a border router node constituting an interface between the plurality of second nodes in the second wireless network and a third wireless network distinct from the first and second wireless networks. According to an exemplary embodiment, each of the plurality of second nodes in the second wireless network being one hop away from the border router node, respectively. The exemplary wireless communication system also includes at least one access point constituting an interface between the plurality of first nodes of the first wireless network and the third wireless network. In accordance with an exemplary embodiment, at least one of the first nodes in the first wireless network is a mesh router node in the first wireless network and a border router node in the second wireless network (MR/BR node), the MR/BR node constituting an interface between the first and second wireless networks, the MR/BR node being configured to communicate with upstream and downstream nodes in the first wireless network, and to communicate with downstream nodes in the second wireless network. The MR/BR node has both a unique first address in the first wireless network and a unique second address in the second wireless network. In accordance with an exemplary embodiment, the MR/BR node is configured to receive a first communication in the first wireless network via the first address of the MR/BR node and transmit the received first communication to at least one of the second nodes in the second wireless network, and to receive a second communication in the second wireless network via the second address of the MR/BR node and transmit the received second communication to at least one of the first nodes in the first wireless network.

An exemplary embodiment of the present disclosure provides a method of communicating in a wireless communication system. In accordance with an exemplary embodiment, the wireless communication system includes a first wireless network having a plurality of first nodes configured to communicate with each other over the first wireless network, where each of the plurality of first nodes in the first wireless network has a respectively unique first address in the first wireless network. The exemplary wireless communication system also includes a second wireless network having a plurality of second nodes configured to communicate with each other over the second wireless network, the second wireless network being distinct from the first wireless network, where each of the plurality of second nodes in the second wireless network has a respectively unique second address in the second wireless network. In addition, the exemplary wireless communication system includes a border router node constituting an interface between the plurality of second nodes in the second wireless network and a third wireless network distinct from the first and second wireless networks. According to an exemplary embodiment, each of the plurality of second nodes in the second wireless network being one hop away from the border router node, respectively. The exemplary wireless communication system also includes at least one access point constituting an interface between the plurality of first nodes of the first wireless network and the third wireless network. In accordance with an exemplary embodiment, the method includes assigning at least one of the first nodes in the first wireless network as a mesh router node in the first wireless network and a border router node in the second wireless network (MR/BR node), where the MR/BR node constitutes an interface between the first and second wireless networks. The MR/BR node is configured to communicate with upstream and downstream nodes in the first wireless network, and to communicate with downstream nodes in the second wireless network. The exemplary method also includes assigning the MR/BR node with both a unique first address in the first wireless network and a unique second address in the second wireless network. In accordance with an exemplary embodiment, the MR/BR node receives a first communication in the first wireless network via the first address of the MR/BR node, and transmits the received first communication to at least one of the second nodes in the second wireless network. Further, in accordance with an exemplary embodiment, the MR/BR node receives a second communication in the second wireless network via the second address of the MR/BR node, and transmits the received second communication to at least one of the first nodes in the first wireless network.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION OF EXEMPLARY EMBODIMENTS

Figure 1:
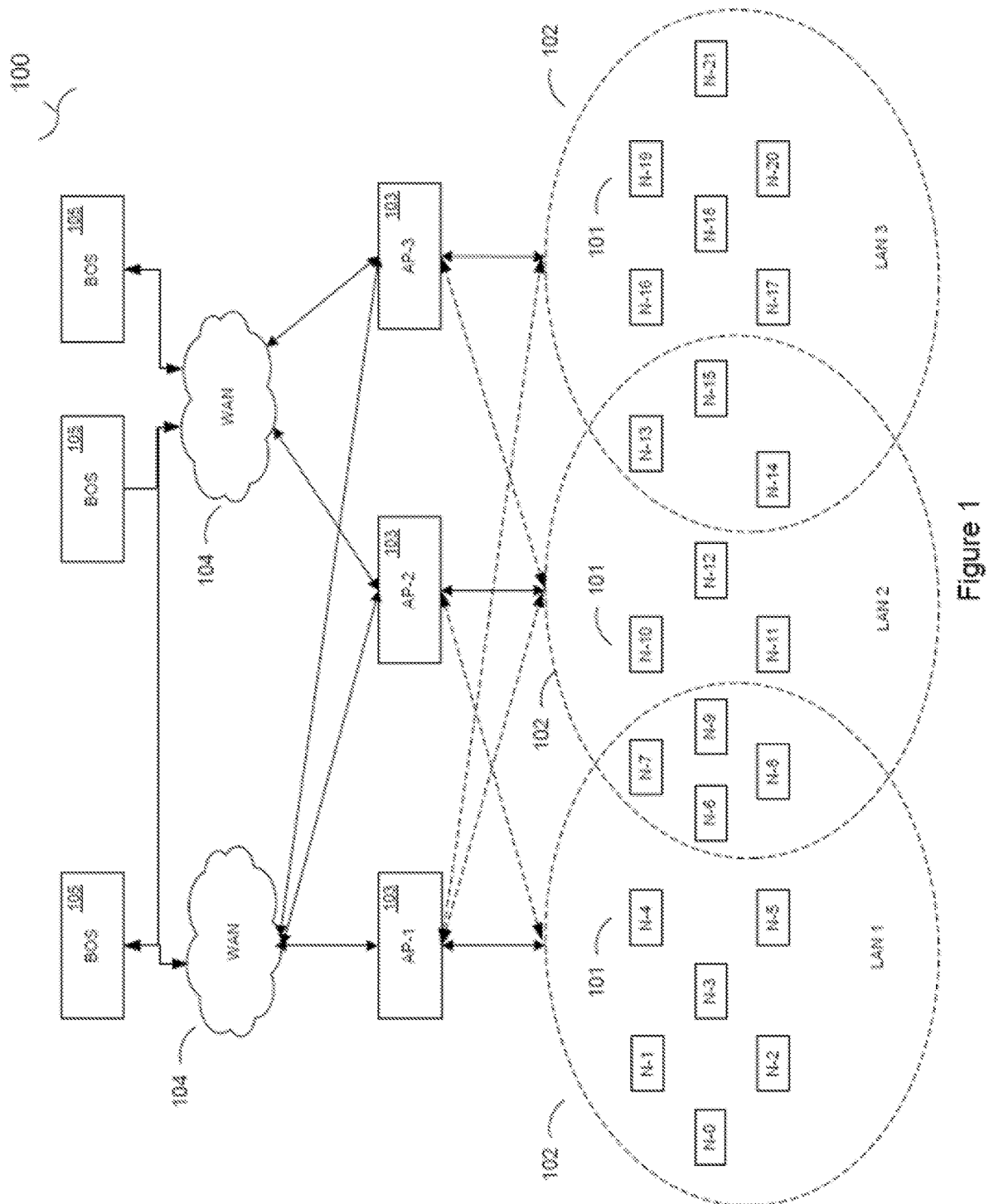
FIG. 1 is a diagram of a system including a mesh network configured for communicating with a cellular network, according to an exemplary embodiment of the present disclosure.

FIG. 1 is a diagram of a system 100 including a mesh network configured for communicating with a cellular network, in accordance with an exemplary embodiment of the present disclosure. In FIG. 1, a plurality of nodes 101 are arranged in one or more LANs 102. In the example of FIG. 1, nodes N-1 to N-9 are arranged in LAN 1, nodes N-7 to N-15 are arranged in LAN 2, and nodes N-13 to N-21 are arranged in LAN 3. As illustrated, some of the nodes can be members of more than one LAN. For instance, nodes N-7 to N-9 are members of LAN 1 and LAN 2, and nodes N-13 to N-15 are members of LAN 2 and LAN 3. The LANs 102 illustrated in FIG. 1 are each respectively an example of a first wireless network as used herein.

The nodes 101 are each connected to one or more access points (AP) 103 which are interfaces between the LANs 102 and a WAN 104 (e.g., a cellular network managed by at least one cellular network provider). The APs 103 may be connected to one or more back office stations (BOS) or servers 105 via the WAN 104. The BOS 105 can function to distribute commands to the APs 103 and/or nodes 101, and to receive data from the nodes 101 and/or APs 103 via the WAN 104.

Each of the nodes 101 is configured to discover other nodes 101 and APs 103 in the mesh network by listening to all neighbors with which it can set up links. The nodes 101 may then construct a routing table with an ordered list of next hops and corresponding path costs (advertised cost of egress by the next hop). The nodes 101 may register with their upstream nodes as well as the APs 103. By registering with the APs 103, the nodes 101 can obtain a respectively unique network address for each AP with which the nodes 101 register. For example, node N-5 can register with AP-1 and AP-2 to obtain (e.g., be assigned) two respectively unique network addresses, one based on the registration with AP-1 and another based on the registration with AP-2. Node N-5 can receive its assigned addresses when receiving registration acknowledgement or confirmation messages from AP-1 and AP-2, respectively. Node N-5's addresses can, for example, be based on a prefix respectively associated with the individual APs and a unique identifier (e.g., MAC address) of the node. For example, node N-5 can have a first address based on a prefix associated with AP-1 and the unique identifier of node N-5, and a second address based on a prefix associated with AP-2 and the unique identifier of node N-5. The nodes 101 can register their address(es) with upstream nodes 101 as well as the APs 103 and BOS 105. A node having multiple addresses provides multiple routes to reach that node. In the above example of node N-5 having two unique addresses, the BOS 105 can transmit commands or data to node N-5 through the WAN 104 via AP-1 or via AP-2.

Figure 2:
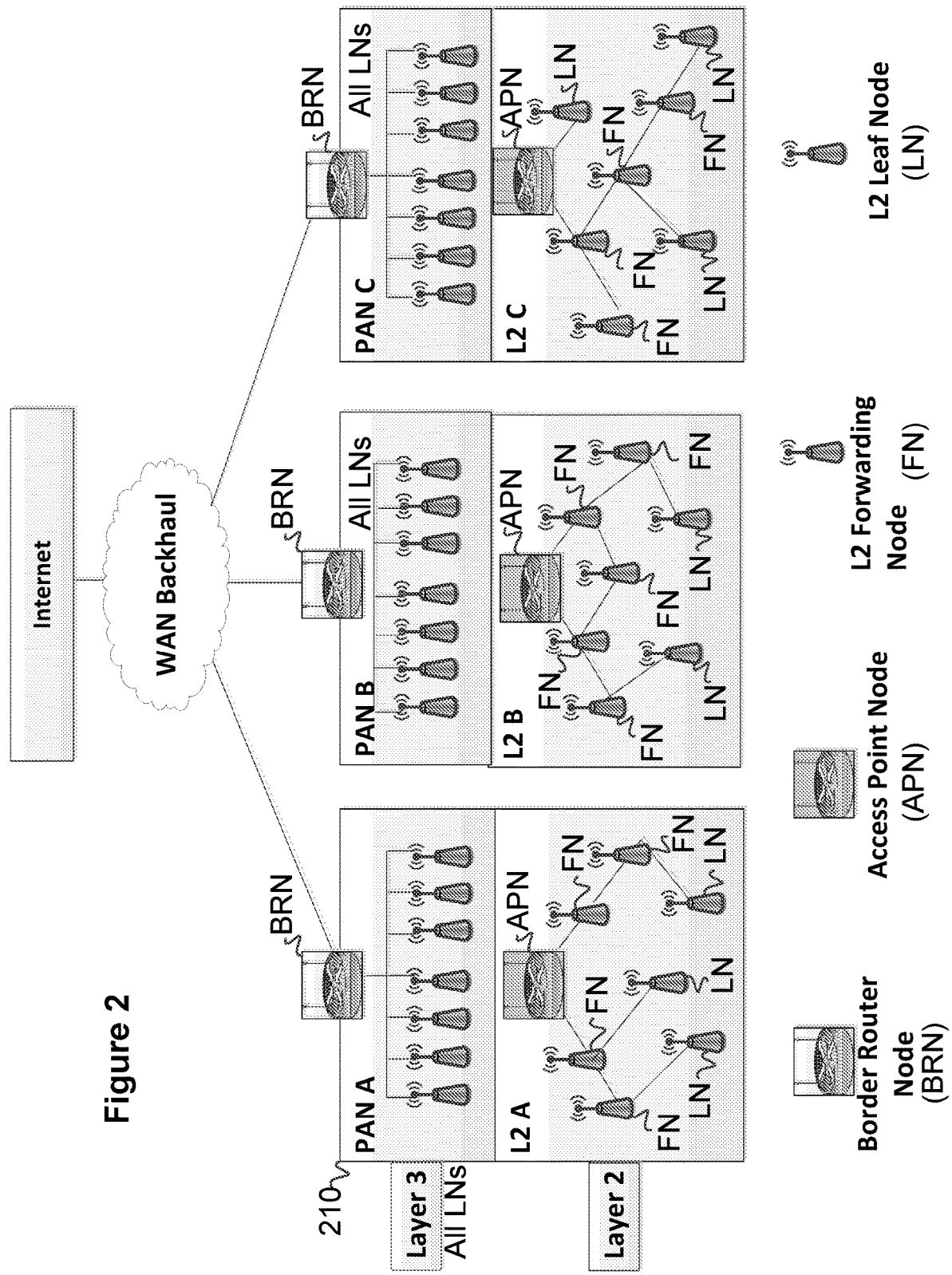
FIG. 2 is a block diagram showing how layer 2 (L2) and layer 3 (L3) networks may be combined in operation in a Wi-SUN field area network, according to an exemplary embodiment of the present disclosure.

The LANs 102 may be referred to as layer 2 (L2) networks, and the WAN(s) 104 may be referred to as layer (L3) networks. FIG. 2 is a diagram showing how L2 and L3 networks may be combined in operation in a Wi-SUN field area network. In FIG. 2, there are three separate personal area networks (PANs) each supporting nodes in the field. The L3 network includes a plurality of leaf nodes (LNs) connected to a border router node (BRN). The BRN is connected to the WAN backhaul (e.g., IPv4 (or IPv6) network interfacing the BOS via the Internet (the BOS may be a back end, head end or control center service, for example), and serves as an interface between the leaf nodes of the L3 network 210 and the WAN. The BRN treats the leaf nodes in the L3 networks as each being one hop away. In FIG. 2, the L3 networks (PAN A, PAN B, and PAN C) are depicted as a routing view at the L3 level. In the L3 network, all nodes appear as one hop away.

In network L2 in FIG. 2, each node is a multi-hop connection to the nodes in the L3 network. In FIG. 2, the L2 network 220 has a mesh network structure similar to that illustrated in FIG. 1. Thus, an access point node (APN)

serves as an interface between the mesh network nodes of the L2 network 220, and the nodes of the L3 network 210.

In FIG. 2, the L2 network nodes includes two types of nodes: forwarding nodes (FNs), and leaf nodes (LNs). The forwarding nodes forward data from other nodes to the access point node. The leaf nodes are downstream of the forwarding nodes. In FIG. 2, service advertisements are initiated at the access point nodes and are propagated by the L2 mesh nodes to advertise the access point nodes' services. With regard to service registration, messages are sent from L2 nodes to join the L2 mesh network. In doing so, the L2 mesh nodes provide a unique identifier (e.g., the MAC address of the node) to join the network and obtain network addresses (e.g., by assignment), as discussed above with respect to FIG. 1. Acknowledgement messages are then from one or more access point nodes (with which the joining node is registering) to join the mesh network. The acknowledgement message can identify the addresses assigned to the mesh nodes when they register with the access point node and join the L2 network. The address(es) assigned to each node can be based on the nodes unique identifier, such as its MAC address. In FIG. 2, upward forwarding from nodes in the L2 network to the access point node occurs along the path of service registration. Downward forwarding from the access point node to the downstream nodes in the L2 network is accomplished by source route using the address (es) assigned to each downstream node (L2 addresses).

In FIG. 2, the combinations of L3 B and L2 B, and L3 C and L2 C operate similar to the combination of L3A and L2A, as shown in FIG. 2. In operation, the leaf nodes in L3 A operate as if each node in L2 A are one hop away. However, as is evident from the network architecture illustrated in FIG. 2, that is not the case. The nodes in L2 A and L3 A must be able to communicate with each other's network. To accomplish this, the nodes in the respective networks L2 and L3 must have nodes that can communicate between the different networks. Further, the L3 network can be made to operate like a mesh network, as shown in FIG. 3.

Figure 3:
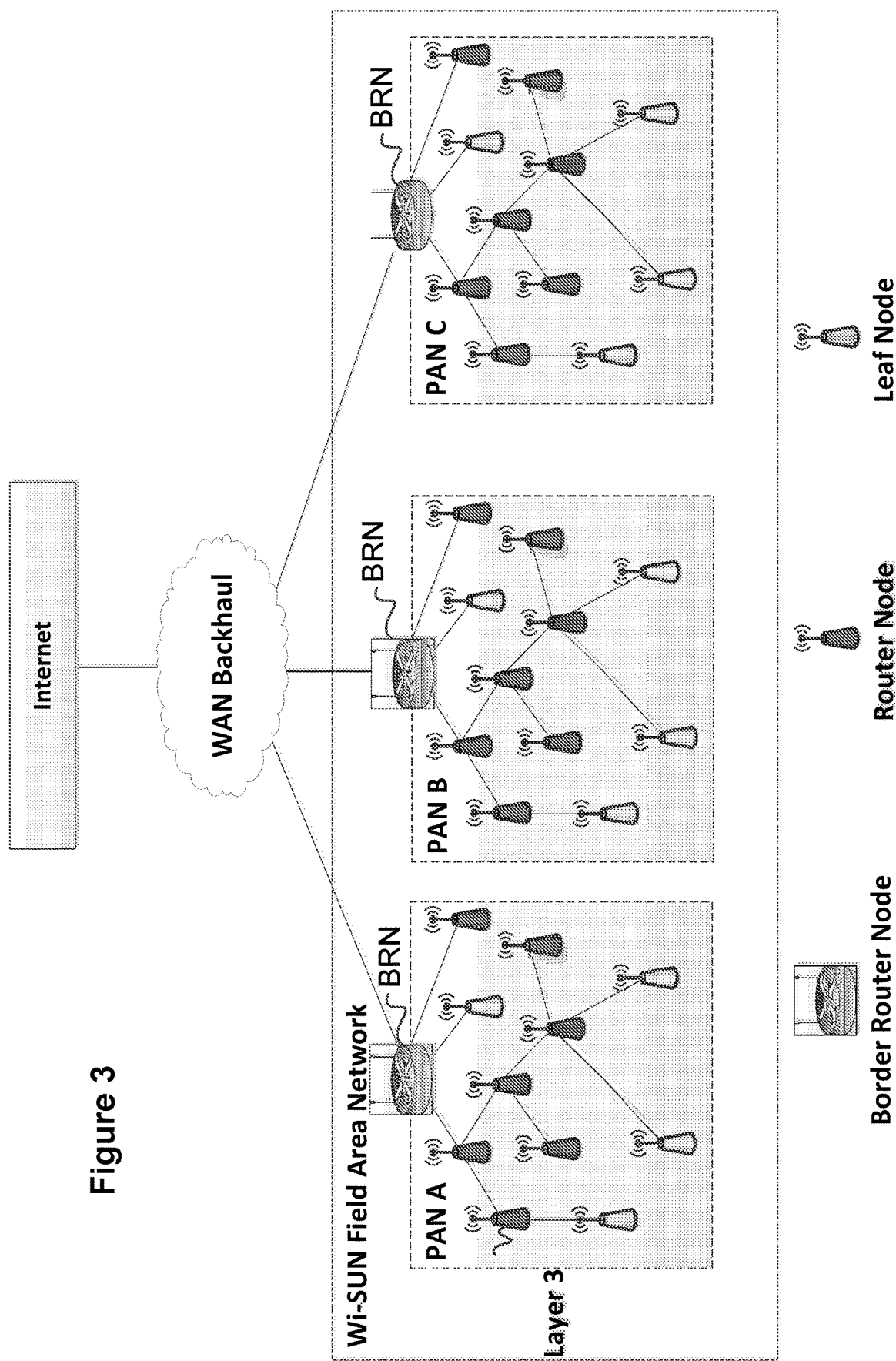
FIG. 3 is a block diagram illustrating how individual personal area networks (PANs) A, B and C of the L3 network can each be configured to operate like a mesh network in a Wi-SUN field area network, according to an exemplary embodiment of the present disclosure.

As shown in FIG. 3, the individual personal area networks (PANs) A, B and C of the L3 network can each be configured to operate like a mesh network in a Wi-SUN field area network. Like the mesh network L2 in FIG. 2, the mesh L3 networks in FIG. 2 include leaf nodes and router nodes (distinguished by shading in FIG. 3). However, unlike the mesh network L2 in FIG. 2, the individual PANs of the L3 network in FIG. 3 have a border router node as the interface to the WAN backhaul, rather than an access point node. In FIG. 3, the WAN backhaul is an IPv4 or IPv6 network interfacing the BOS (backend/head end/control center) via the Internet to the L3 nodes via a border router node. Similar to FIG. 2, PAN A, PAN B, and PAN C represent distinct personal area networks. In FIG. 3, the layer 3 networks under the border router nodes depict the routing view in the L3 network. Each router node or leaf node in the L3 network appears in a multi-hop network within PAN A, PAN B or PAN C to the respective border routers.

In FIG. 3, network forwarding for Wi-SUN L3 mesh routing is accomplished in the upward (e.g., from a leaf node to the border router node) and downward (e.g., from a border router node to a leaf node) directions. In the L3 mesh network illustrated in FIG. 3, upward forwarding from the L3 nodes to the border router node is by rank (hops away from the border router node). All upward forwarding must go to a neighbor that is one less in rank than the forwarding device. Downward forwarding from the border router node to the router nodes or leaf nodes is by source route using IP addresses (L3 addresses).

The nodes in private L2 networks and the nodes in public L3 networks must be able to communicate with each other's network if there is to be cooperation between the networks. To accomplish this, the nodes in the respective networks L2 and L3 must have nodes that can communicate between the different networks. The present disclosure provides a technique of combining L2 and L3 networks to permit intercommunication between the nodes in private L2 networks and the nodes in public L3 networks.

Figure 4:
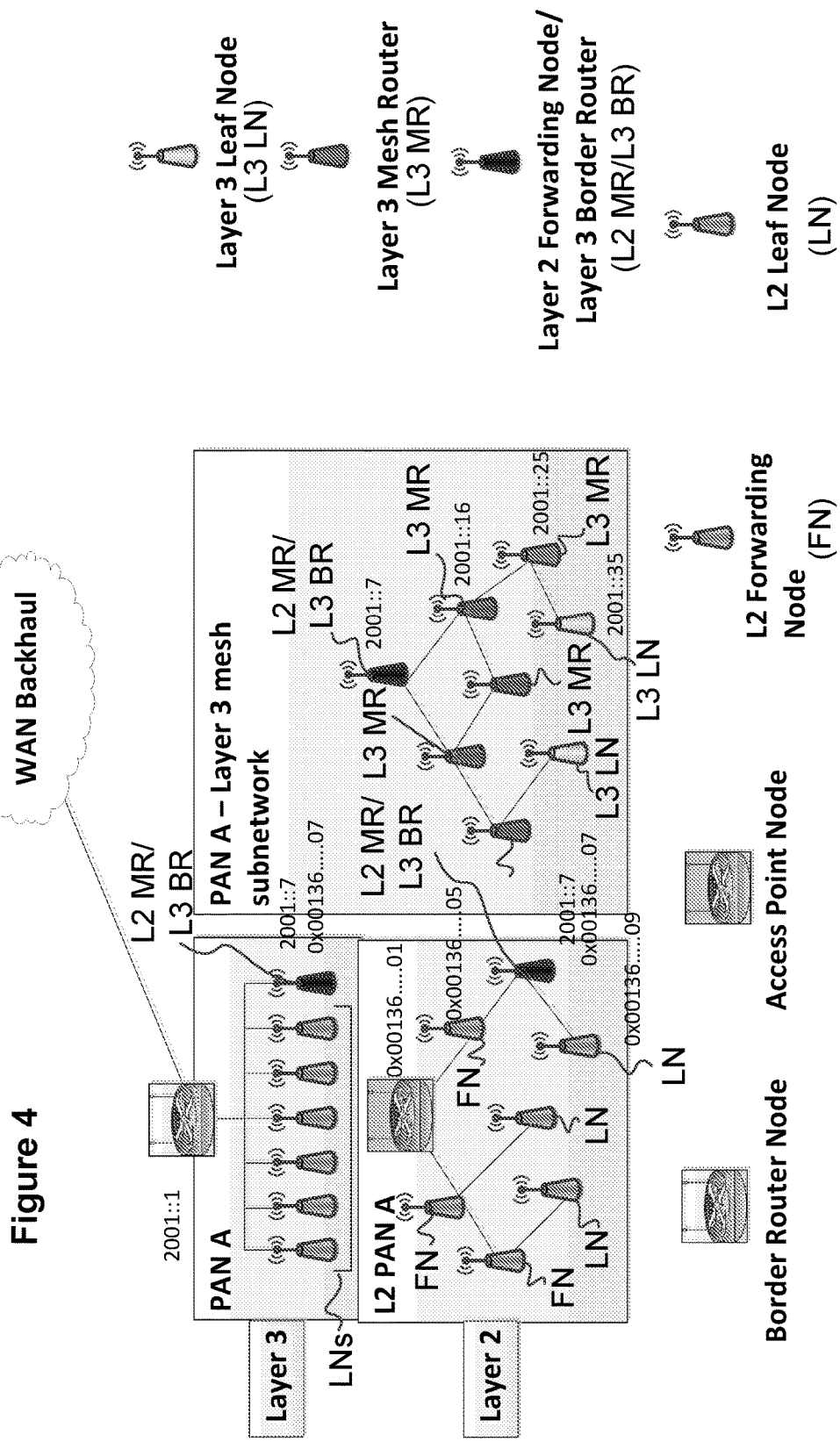
FIG. 4 illustrates a combination of an L2 mesh network as shown in FIG. 2 with an L3 mesh network as shown in FIG. 3, according to an exemplary embodiment of the present disclosure.

FIG. 4 illustrates a combination of an L2 mesh network as shown in FIG. 2 with an L3 mesh network as shown in FIG. 3. The exemplary embodiment of FIG. 4 introduces a new type of node that is not illustrated in FIGS. 2 and 3: a layer 2 mesh router, layer 3 border router (L2 MR/L3 BR). In FIG. 4, the layer 3 leaf node (L3 LN) is a leaf node in the L3 mesh network, the layer 2 mesh router is the same as the forwarding node in FIG. 2, and the layer 3 mesh router (L3 MR) is the same as the router node in FIG. 3. In the combined system, layer 2 mesh router, layer 3 border router (L2 MR/L3 BR) node is a special construction node, and is programmed to know that it is a special construction node. The L2 mesh router, L3 border router (L2 MR/L3 BR) nodes are interfaces between the L2 and L3 networks. According to an exemplary embodiment, the L2 mesh router, L3 border router (L2 MR/L3 BR) nodes may perform channel hopping. Such channel hopping is not limited to frequency hopping. According to an exemplary embodiment, the layer 2 mesh router, layer 3 border router (L2 MR/L3 BR) node is the only node in the combined system that has to know how to perform such channel hopping, because it is operating according to two different network communication protocols, e.g., L2 mesh network addressing, and L3 addressing (IP addressing). The channel hopping utilized by the layer 2 mesh router, layer 3 border router (L2 MR/L3 BR) node is independent of the L2 or L3 device addressing or the communication or addressing protocol in use for either the L2 or L3 network. In essence, the channel hopping utilized by the layer 3 border router (L2 MR/L3 BR) is a variation on the physical media (e.g., frequency spectrums) in use for the respective networks. The L2 mesh devices (e.g., L2 mesh router) and the L3 border router nodes may or may not be operating using channel hopping.

Figure 5:
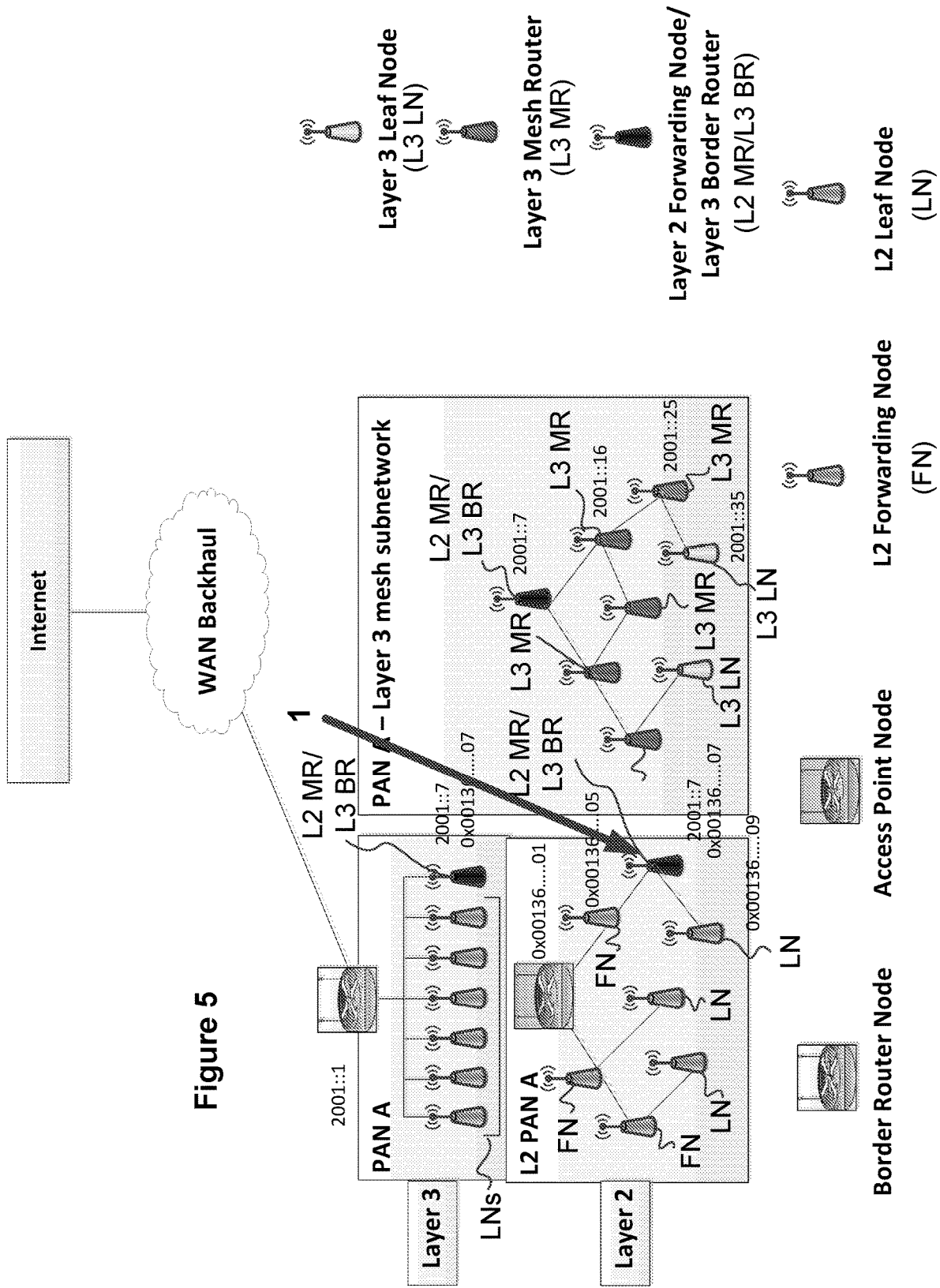
FIGS. 5-12 illustrate exemplary embodiments of registration procedures and routing procedures which are implemented in the combined system of FIG. 4.
Figure 6:
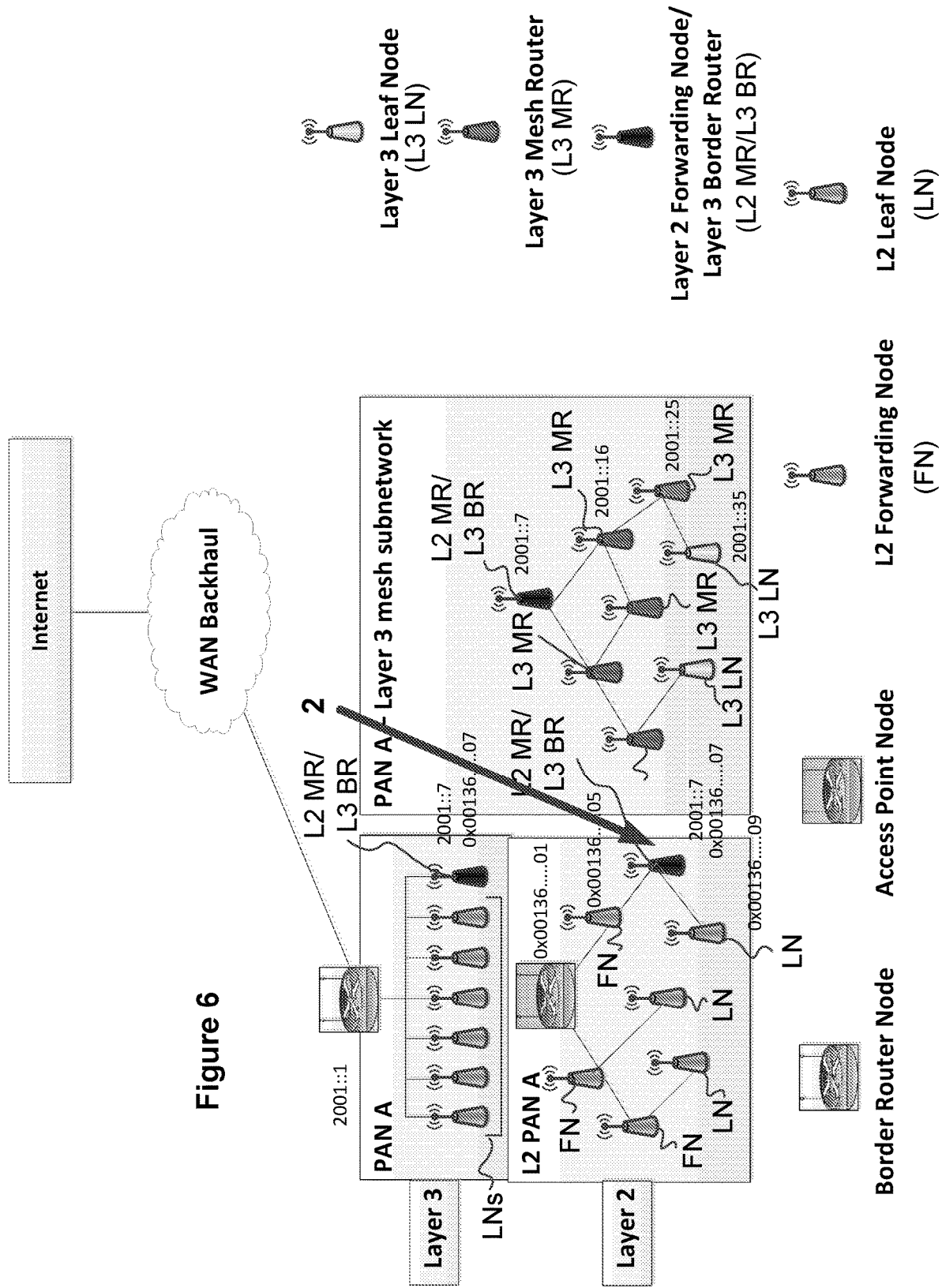

FIGS. 5-12 illustrate exemplary embodiments of registration procedures and routing procedures which are implemented in the combined system of FIG. 4. In FIG. 5, arrow 1 pointing to the L2 mesh router/L3 border router node identifies the L2 mesh router/L3 border router node that can communicate in both networks L2 and L3. The L2 mesh router/L3 border router node registers with the L2 access point (with address 0x00136 . . . 01) when the L2 mesh router/L3 border router node joins the L2 network. The L2 mesh router/L3 border router node will register its L2 address with the L2 access point (and other neighbor nodes in the L2 network) like all other L2 nodes, but the L2 mesh router/L3 border router node will also register its L3 network address, as well as the prefix it will support, to the IP forwarding table supporting the L2 access point. Thus, the L2 mesh router/L3 border router node can serve as an interface between the L2 and L3 networks when the access point in the L2 network receives a packet from the WAN targeted to a node with address 2001::35, for example. In other words, as indicated in FIG. 5, the L2 mesh router, L3 border router node with MAC address 0x00136 . . . 07 joins the L2 mesh network by registering with the access point node of the L2 node as a forwarding node for the L3 network. Thus, node 2001::7 has registered with the access point in the L2 network as the gateway to the Layer 3 sub-network. The nodes with addresses 2001::16, 2001::25 and 2001::35 have registered their addresses with the AP with a gateway as 0x00136 . . . 07 (2001::7). The aforementioned example is based on using the same 2001:: prefix for both the L2 mesh devices and the L3 mesh devices. The present disclosure is not limited to this example. A different prefix can be allocated to the L2 mesh devices than the prefix allocated to the L3 mesh devices, and the registration process with the L2 access point can thereby be simplified so that only one entry in the IP forwarding table of the L2 access point that gives the prefix in use in the L3 mesh network. In this case, the L2 mesh router/L3 border router node will have two IP addresses, one using the prefix in use for the L2 mesh network, and another one using the prefix in use for the L3 mesh network. When a different prefix is used for the L2 and L3 mesh devices, there is only one registration process that needs to occur when the L2 mesh router/L3 border router node begins to operate in its specialized function as the L2 mesh router/L3 border router node. A tradeoff with using different prefixes is that packets would have to be downward routed to the L3 border router before it can be known that a destination address is unreachable, as opposed to having the packet returned by the L2 access point who would know if a particular L3 mesh device was registered if the same prefix was used for both L2 and L3 devices. The present disclosure allows for information to be shared outside of the L2 mesh network to a device that is capable of forwarding the IP packets with a mechanism to reach devices in the L3 mesh network.

FIGS. 6-9 illustrate routing procedures in the combined system. As designated by arrow 2 in FIG. 6, the access point of AP finds 2001::35 is reachable through the AP with a Layer 2 gateway of 0x00136 . . . 07. This operation illustrates a new protocol addition, because the node with MAC address 0x00136 . . . 07 registers with Access Point as a gateway to a Layer 3 mesh subnetwork via MAC address 0x00136 . . . 07.

Figure 7:
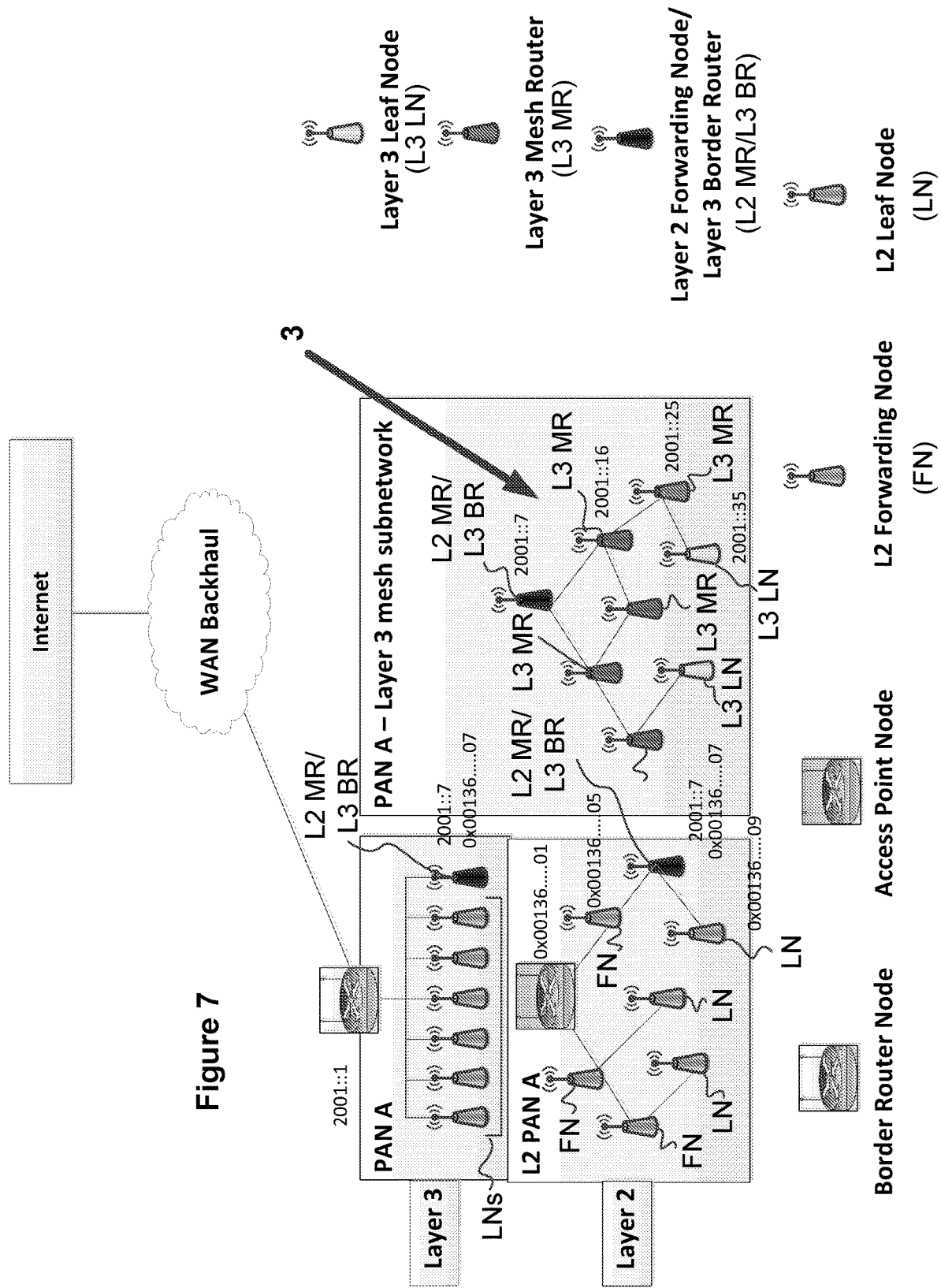

FIG. 7 illustrates the establishment of a standard L3 mesh network. In particular, as shown by arrow 3 in FIG. 7, the L2 mesh router/L3 border router node with device address 2001::7 is a border router and creates an L3 Mesh subnetwork. The node with address 2001::16 joins the L3 Mesh. Nodes 2001::25 and 2001::35 similarly join the L3 mesh. Likewise, the un-numbered devices in the L3 mesh subnetwork join the L3 mesh. In accordance with the depiction in FIG. 7, the access point source routes from 0x00136 . . . 01 (itself), 0x00136 . . . 05, 0x00136 . . . 07 (gateway).

Figure 8:
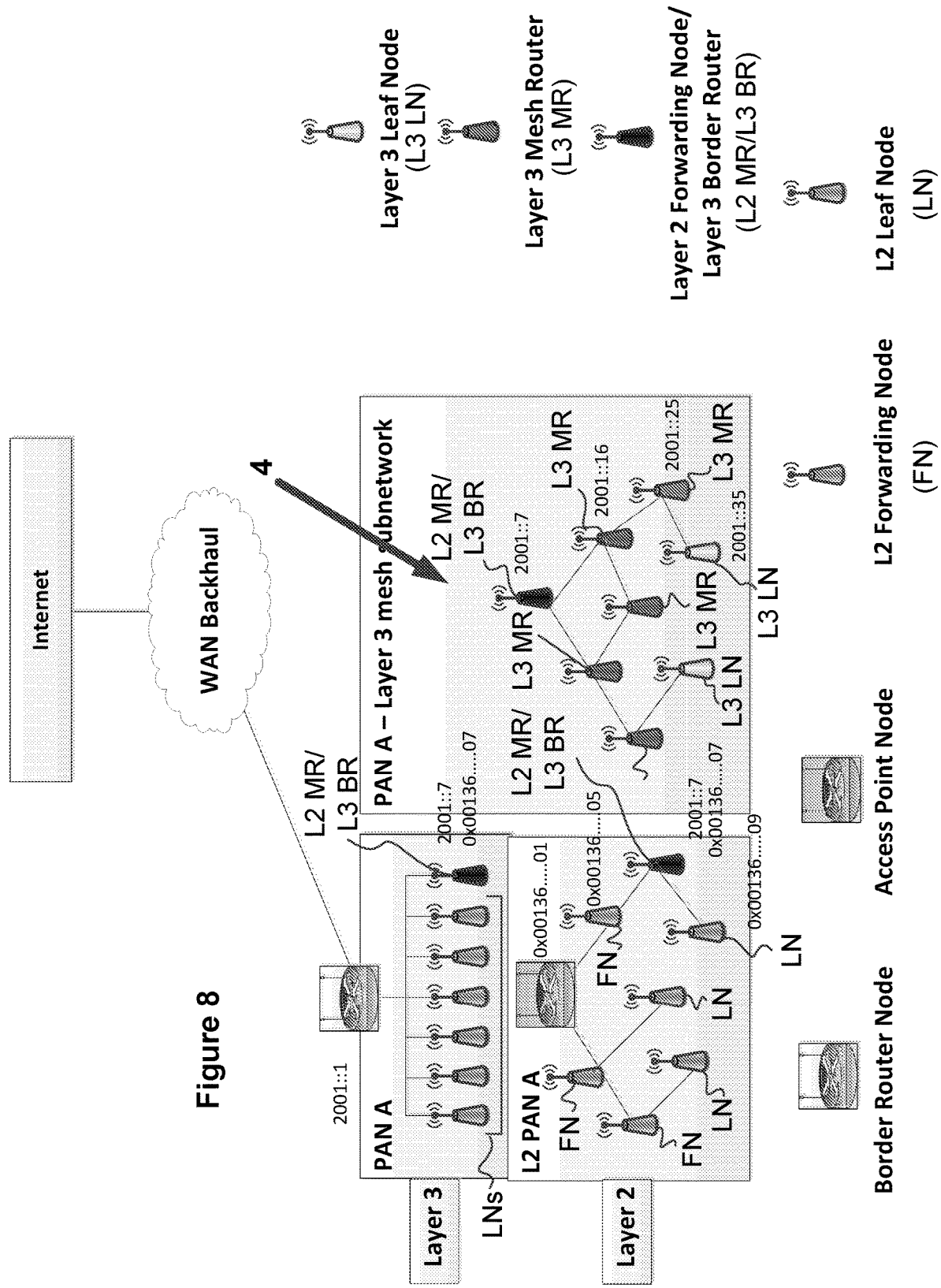

FIG. 8 illustrates a new protocol addition, where the node with IP address 2001::7 (i.e., the L2 mesh router, L3 border router) sends a message to the L2 access point registering node 2001::16 as accessible via the gateway of 2001::7 (L2 mesh node with MAC address 0x00136 . . . 07). Node 2001::25 and 2001::35 join the Layer 3 mesh subnetwork and are reported to the access point, accessible via gateway 2001::7. In accordance with an exemplary embodiment, the present disclosure provides for the ability to register a whole range of addresses (e.g., 2001::1 to 2001::64), where different prefixes can be used outside the L3 mesh. The use of different prefixes between the devices of the L2 mesh network and the devices of the L3 mesh network achieve the advantages as described above. Using different prefixes with the L2 and L3 mesh devices avoids having to register every address in the L3 mesh network.

Figure 9:
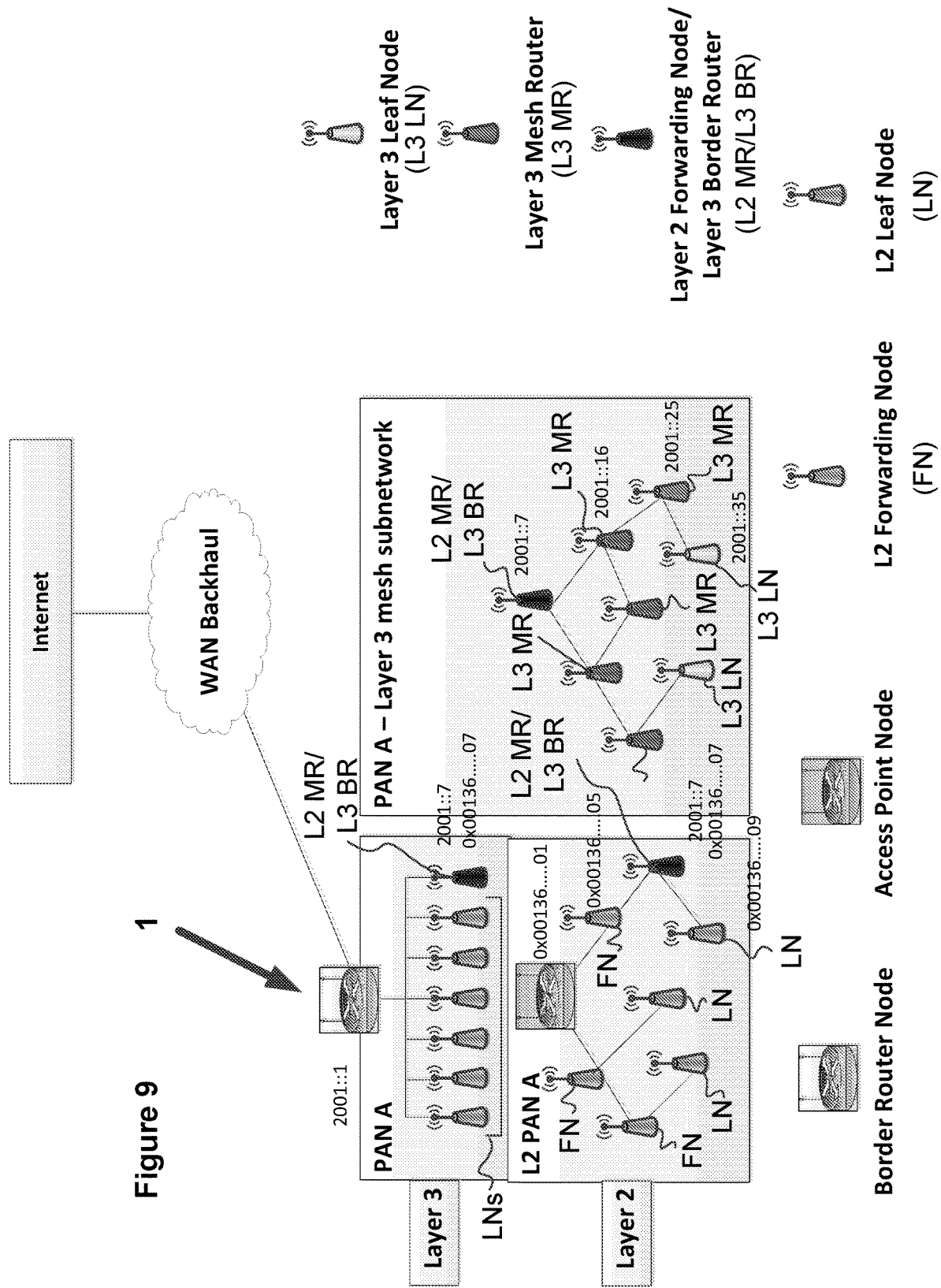
Figure 10:
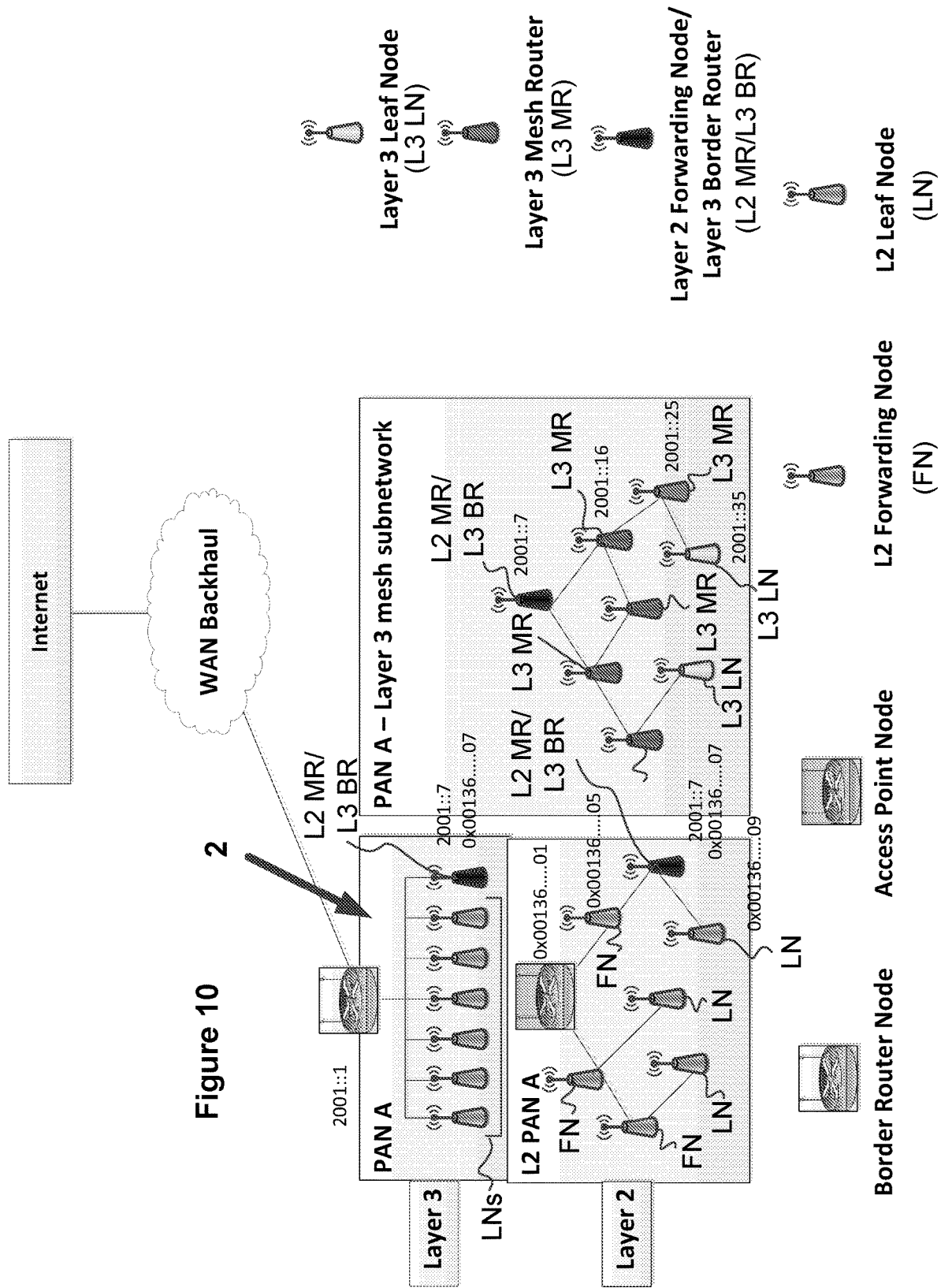
Figure 11:
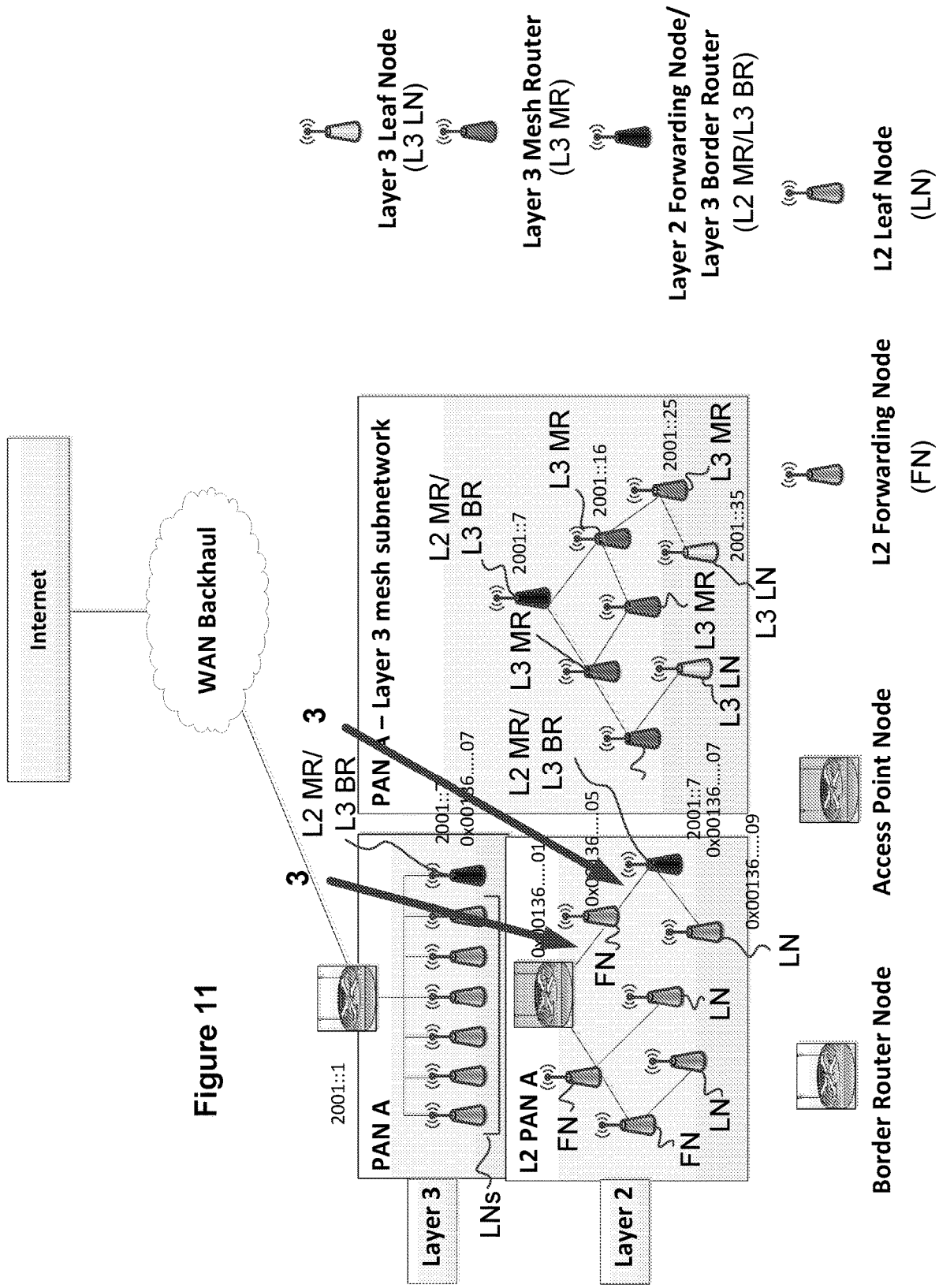

FIG. 9 illustrates a downward routing example where the access point receives a packet from the WAN targeted to 2001::35. In FIG. 10, the access point finds that address 2001::35 is reachable through the access point with a Layer 2 gateway of 0x00136 . . . 07. Next, in FIG. 11, the access point with address 0x00136 . . . 01 routes to the node with address 0x00136 . . . 05, which in turn routes to the node with address 0x00136 . . . 07, i.e., the L2 mesh router, L3 border router node.

Figure 12:
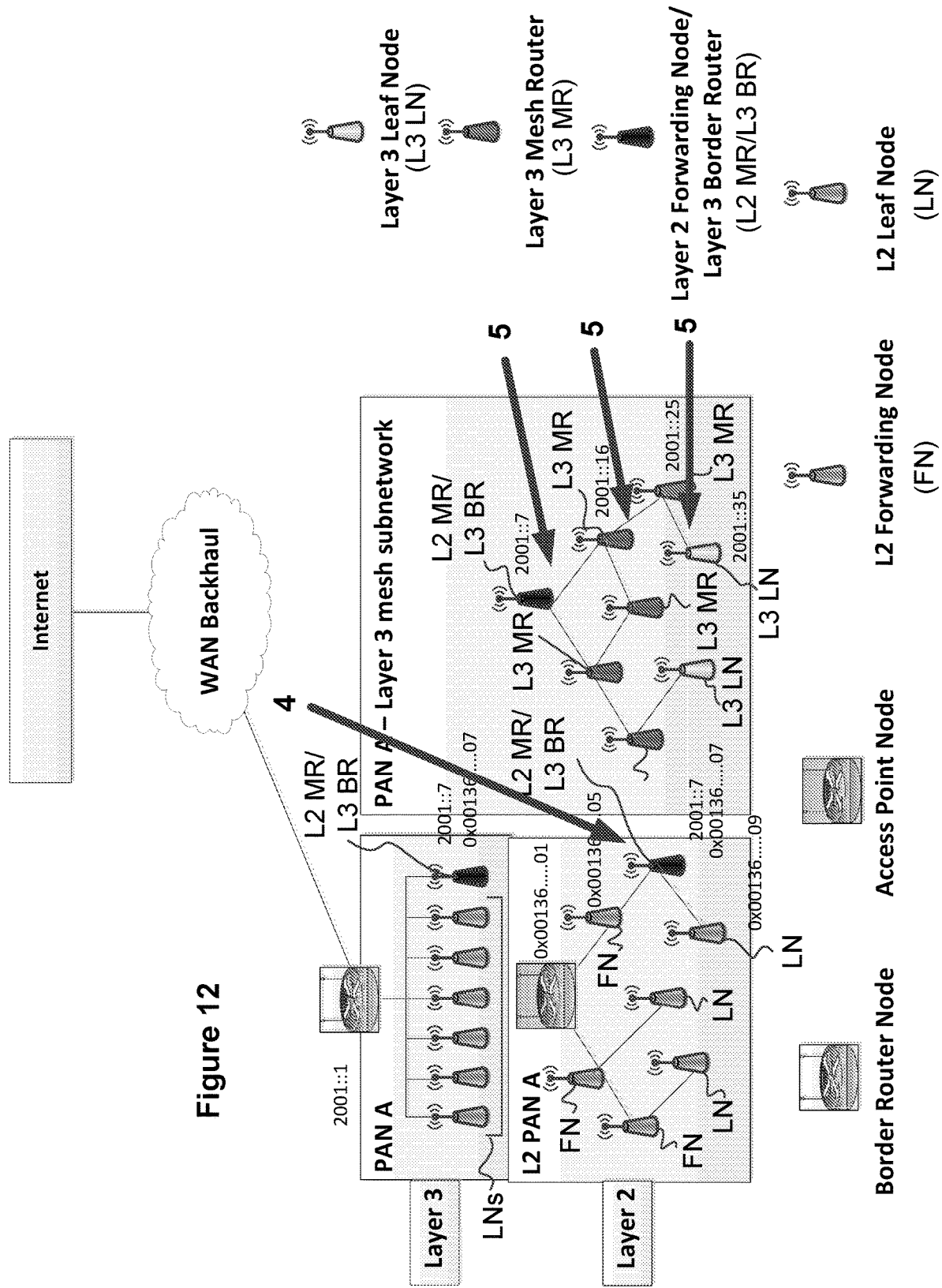

In FIG. 12, arrow 4 illustrates L3 mesh routing where the L2 mesh router, L3 border router node extracts the IP packet and finds that the destination is 2001::35, thereby resulting in new packet forwarding added to the L2 mesh. In FIG. 12, arrows 5 represent L3 mesh routing in which the L2 mesh router, L3 border router node with address 2001::7 routes via the layer 3 mesh to the node with address 2001::25, which in turn routes to the node with address 2001::35.

In the above examples illustrated in FIGS. 9-12, the access point receives a packet from the WAN targeted to a node with address 2001::35. The L2 mesh router, L3 border router node with address 2001::7 has registered with the access point as the gateway to the Layer 3 sub-network. The nodes with 2001::16, 2001::25 and 2001::35 have registered their addresses with the access point with a gateway as address 0x00136 . . . 07 (2001::7). As noted above, the present disclosure provides for the use of different prefixes between the devices of the L2 mesh network and the devices of the L3 mesh network, which avoids having to register every address in the L3 mesh network. The forwarding/routing process then proceeds as discussed above with respect to FIGS. 10-12. The examples of FIGS. 9-12 illustrate downward routing. Forward/upward routing would operate in a similar manner in the combined system. In particular, forward/upward routing would involve IP forwarding to the L2 mesh router, L3 border router node, then L2 mesh forwarding to the access point in the L2 network, and then forwarding to the destination.

Figure 13:
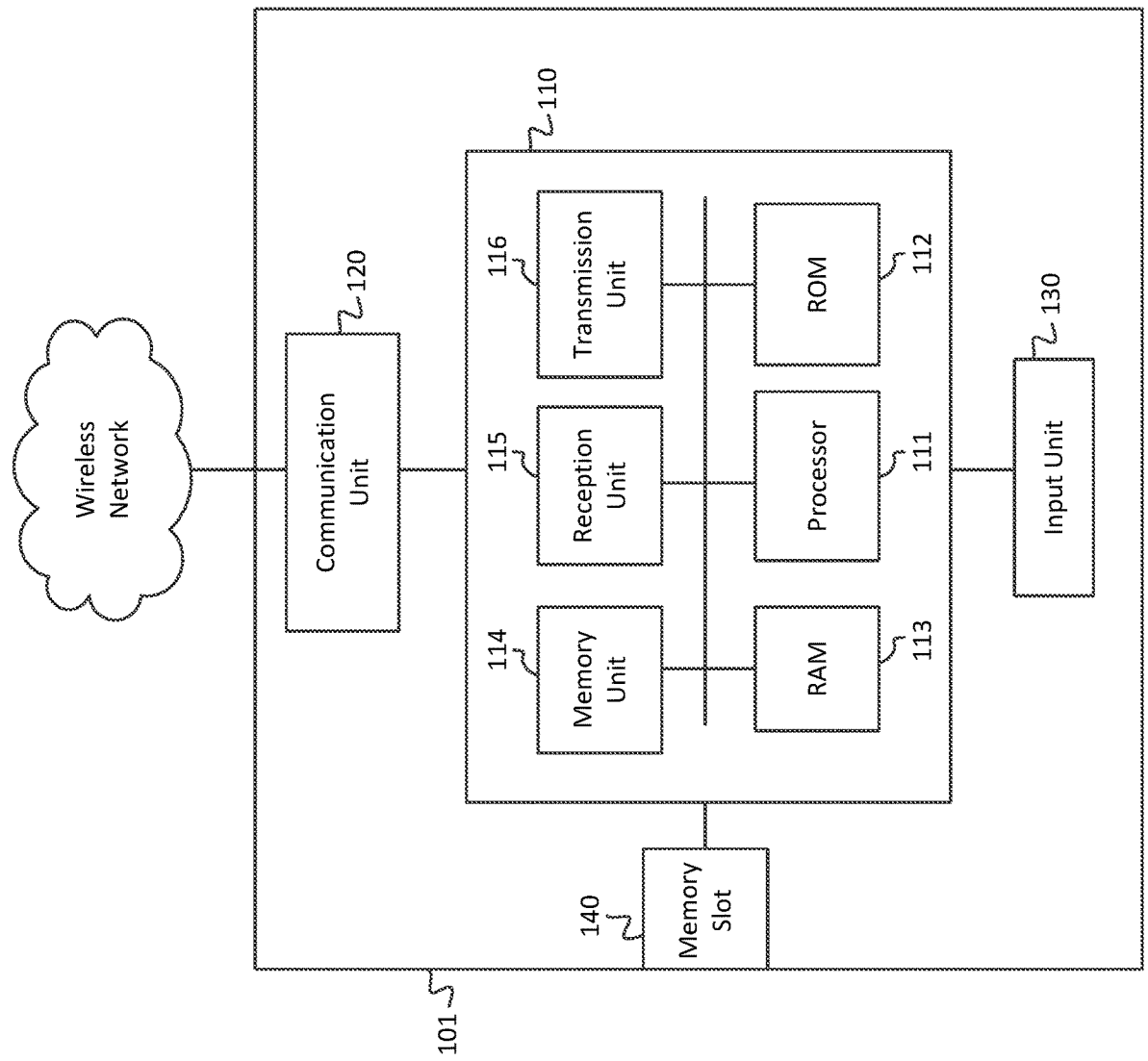
FIG. 13 is a block diagram illustrating structural features of a node in the wireless communication system, according to an exemplary embodiment of the present disclosure.

The foregoing exemplary embodiments of the wireless communication system were described with respect to the features that the nodes in the wireless communication system perform. FIG. 13 is a block diagram of the structural features of a node in the wireless communication system according to an exemplary embodiment of the present disclosure. As an example, the structural features of a node 101 in the mesh network of FIG. 1 (L2 network in FIG. 2) is illustrated in FIG. 13. The nodes in the L3 network as well as the border router node, access point node, MR/BR node, and back office server (BOS) can have a similar structure to the node 101 illustrated in FIG. 13.

As shown in FIG. 13, the node 101 includes a processing unit 110, a communication unit 120, an input unit 130, and a memory slot 140. The processing unit 110 includes a processor 111, a read-only memory (ROM) 112, a random access memory (RAM) 113, a memory unit 114, a reception unit 115, and a transmission unit 116. The processor 111 controls the aggregate functions of each component of the node 101. The processor 111 may include a general-purpose processor such as an ARM, Intel or AMD processor, and/or an Application-Specific Integrated Circuit (ASIC).

The ROM 112 stores programs, such as an operating system and computer-readable application programs, and logic instructions which are executed by the processor 111. The memory unit 114 is a non-volatile memory which can also record computer-readable application programs to be executed by the processor 111. The memory slot 140 is configured to receive a removable non-volatile memory card and/or disc inserted therein, such as a CD-ROM, DVD- ROM, BD-ROM, flash memory, optical memory, etc. The memory slot 140 communicatively couples terminals of the removable memory card/disc to the processing unit 110 to provide the components of the processing unit 110 access to data and application programs recorded on the memory card/disc, and to store data thereon. The RAM 113 is used as a working memory by the processor 111 when executing the programs and logic instructions recorded in the ROM 112, memory unit 114 and/or memory card/disc inserted into the memory slot 140. The ROM 112, memory unit 114 and memory card/disc inserted into the memory slot 140 are examples of a non-transitory computer-readable recording medium on which an operating system and/or application programs of the node 101 can be recorded and executed by the processor 111. The processor 111 is configured to communicate with any of these computer-readable recording media and thus is communicatively connected to these computer-readable media.

The reception unit 115 receives data from the communication unit 120 and forwards the received data to the processor 111 for appropriate processing. The transmission unit 116 receives data that is instructed to be sent to the communication unit 120 by the processor 111, and transmits the instructed data to the communication unit 120.

The communication unit 120 is an interface (e.g., transceiver) between the node 101 and other nodes in the wireless network(s) in which the node is assigned an address, such as forwarding nodes, leaf nodes, border router nodes, and access point nodes. The communication unit 120 can transmit data to one or more nodes as individual messages, a multicast message or a broadcast message. The communication unit 120 also receives data and/or instructions from other nodes in the wireless network. Received data and/or instructions are forwarded to the processor 111 by the reception unit 115.

The input unit 130 can include keys and pointing devices that can be manipulated by an operator of the node 101. For example, the input unit 130 can include a QWERTY keyboard, a trackball or similar selecting and pointing device, a number pad, etc. The input unit 130 can include a display device configured to visually display an input received by such keys and/or pointing devices. The input unit 130 can also include a multi-input touch screen with a virtual keyboard and buttons represented in a graphical user interface (GUI). Operating instructions received by the input unit 130 are forwarded to the processor unit 111.

As noted above, the nodes in the L3 network as well as the border router node, access point node, MR/BR node, and back office server (BOS) can have a similar structure to the node 101 illustrated in FIG. 13. For nodes that are configured to communicate with other nodes in more than one network, the communication unit of such multi-network nodes can be embodied as a single transceiver configured to communicate with multiple networks. Alternatively, the communication unit of multi-network nodes can be embodied as separate transceivers each respectively configured to communicate with one or more of the networks with which the multi-network node can communicate. The back office server (BOS) may be distributed across multiple devices in multiple locations.

In addition to providing a wireless communication system in accordance with the above-described exemplary embodiments, the present disclosure also provides a method of operating such a wireless communication system. In the exemplary method of the present disclosure, the wireless communication system includes features of the above-described exemplary embodiments (e.g., FIG. 4). In accordance with an exemplary embodiment, the method includes assigning at least one of the first nodes in the first wireless network as a mesh router node in the first wireless network and a border router node in the second wireless network (MR/BR node), where the MR/BR node constitutes an interface between the first and second wireless networks. The MR/BR node is configured to communicate with upstream and downstream nodes in the first wireless network, and to communicate with downstream nodes in the second wireless network. The exemplary method also includes assigning the MR/BR node with both a unique first address in the first wireless network and a unique second address in the second wireless network. In accordance with an exemplary embodiment, the MR/BR node receives a first communication in the first wireless network via the first address of the MR/BR node, and transmits the received first communication to at least one of the second nodes in the second wireless network. Further, in accordance with an exemplary embodiment, the MR/BR node receives a second communication in the second wireless network via the second address of the MR/BR node, and transmits the received second communication to at least one of the first nodes in the first wireless network. The exemplary method of the present disclosure can also include features of the exemplary embodiments of the wireless communication system as described above.

It will be appreciated by those skilled in the art that the disclosed embodiments can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. In the claims, the word "comprising" or "including" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage.

What is claimed is:

1. A network node (MR/BR node) configured as a mesh router node in a first wireless network comprised of a plurality of first nodes and as a border router node in a second wireless network comprised of a plurality of second nodes, the second wireless network being distinct from the first wireless network, the border router node providing an interface between the second nodes of the second wireless network and a third wireless network distinct from the first and second wireless networks, the MR/BR node configured to communicate with upstream and downstream nodes in the first wireless network and to communicate with downstream nodes in the second wireless network and having a unique first address in the first wireless network and a unique second address in the second wireless network, the MR/BR node configured to:

receive a first communication in the first wireless network via the first address; and transmit the received first communication to at least one of the second nodes in the second wireless network;

and the MR/BR node further configured to:

receive a second communication in the second wireless network via the second address; and transmit the received second communication to at least one of the first nodes in the first wireless network.

2. The MR/BR node of claim 1, further configured to:
allow each second node downstream of the MR/BR node to register a respectively unique second address of that second node with the MR/BR node; and
register the respectively unique second address of each second node with at least one access point, the at least one access point constituting an interface between the first nodes of the first wireless network and the third wireless network such that the at least one access point can route, via the MR/BR node, communications addressed to at least one second node in the second wireless network whose unique second address is registered with the MR/BR node.

3. The MR/BR node of claim 1, further configured to:
allow each first node downstream of the MR/BR node to register a respectively unique first address of that first node with the MR/BR node; and
register the respectively unique first address of each first node with at least one other border router node such that the at least one other border router node can route, via the MR/BR node, communications addressed to at least one first node in the first wireless network whose unique first address is registered with the MR/BR node.

4. The MR/BR node of claim 1, further configured to:
receive, via the first address of the MR/BR node, the first communication in the first wireless network from at least one access point, the at least one access point constituting an interface between the first nodes of the first wireless network and the third wireless network; and
transmit the received first communication to at least one of the second nodes in the second wireless network.

5. The MR/BR node of claim 1, further configured to:
receive, via the first address of the MR/BR node, the first communication in the first wireless network from at least one other first node in the first wireless network downstream of the MR/BR node; and
transmit the received first communication to at least one of the second nodes in the second wireless network.

6. The MR/BR node of claim 1, further configured to:
receive, via the second address of the MR/BR node, the second communication in the second wireless network from at least one other border router node; and
transmit the received second communication to at least one of the first nodes in the first wireless network.

7. The MR/BR node of claim 1, further configured to:
receive, via the second address of the MR/BR node, the second communication in the second wireless network from at least one second node in the second wireless network downstream of the MR/BR node; and
transmit the received second communication to at least one of the first nodes in the first wireless network.

8. A method of communicating in a wireless communication system by a network node (MR/BR node) configured as a mesh router node in a first wireless network comprised of a plurality of first nodes and as a border router node in a second wireless network comprised of a plurality of second nodes, the second wireless network being distinct from the first wireless network, the border router node providing an interface between the second nodes of the second wireless network and a third wireless network distinct from the first and second wireless networks, the MR/BR node configured to communicate with upstream and downstream nodes in the first wireless network and to communicate with downstream nodes in the second wireless network and having a unique first address in the first wireless network and a unique second address in the second wireless network, the method comprising, by the MR/BR node:
receiving a first communication in the first wireless network via the first address of the MR/BR node and transmitting the first communication to at least one of the second nodes in the second wireless network; and
receiving a second communication in the second wireless network via the second address of the MR/BR node and transmitting the received second communication to at least one of the first nodes in the first wireless network.

9. The method of claim 8, further comprising, by the MR/BR node:
allowing each second node downstream of the MR/BR node to register a respectively unique second address of that second node with the MR/BR node; and
registering the respectively unique second address of each second node with at least one access point, the at least one access point constituting an interface between the first nodes of the first wireless network and the third wireless network such that the at least one access point can route, via the MR/BR node, communications addressed to at least one second node in the second wireless network whose unique second address is registered with the MR/BR node.

10. The method of claim 8, further comprising, by the MR/BR node:
allowing each first node downstream of the MR/BR node to register a respectively unique first address of that first node with the MR/BR node; and
registering the respectively unique first address of each first node with at least one other border router node such that the at least one other border router node can route, via the MR/BR node, communications addressed to at least one first node in the first wireless network whose unique first address is registered with the MR/BR node.

11. The method of claim 8, further comprising, by the MR/BR node:
receiving, via the first address of the MR/BR node, the first communication in the first wireless network from at least one access point, the at least one access point constituting an interface between the first nodes of the first wireless network and the third wireless network; and
transmitting the received first communication to at least one of the second nodes in the second wireless network.

12. The method of claim 8, further comprising, by the MR/BR node:
receiving, via the first address of the MR/BR node, the first communication in the first wireless network from at least one other first node in the first wireless network downstream of the MR/BR node; and
transmitting the received first communication to at least one of the second nodes in the second wireless network.

13. The method of claim 8, further comprising, by the MR/BR node:
receiving, via the second address of the MR/BR node, the second communication in the second wireless network from at least one other border router node; and
transmitting the received second communication to at least one of the first nodes in the first wireless network.

14. The method of claim 8, further comprising, by the MR/BR node:
receiving, via the second address of the MR/BR node, the second communication in the second wireless network from at least one second node in the second wireless network downstream of the MR/BR node; and transmitting the received second communication to at least one of the first nodes in the first wireless network.

15. At least one non-transitory computer readable medium having computer program logic stored thereon, the computer program logic including instructions that, when executed by a processor of a network node (MR/BR node), the MR/BR node configured as a mesh router node in a first wireless network comprised of a plurality of first nodes and as a border router node in a second wireless network comprised of a plurality of second nodes, the second wireless network being distinct from the first wireless network, the border router node providing an interface between the second nodes of the second wireless network and a third wireless network distinct from the first and second wireless networks, the MR/BR node configured to communicate with upstream and downstream nodes in the first wireless network and to communicate with downstream nodes in the second wireless network and having a unique first address in the first wireless network and a unique second address in the second wireless network, cause the processor to:

receive a first communication in the first wireless network via the first address of the MR/BR node and transmit the first communication to at least one second node in the second wireless network; and receive a second communication in the second wireless network via the second address of the MR/BR node and transmit the received second communication to at least one first node in the first wireless network.

16. The at least one non-transitory computer readable medium of claim 15, wherein the instructions further cause the processor to:

allow each second node downstream of the MR/BR node to register a respectively unique second address of that second node with the MR/BR node; and register the respectively unique second address of each second node with at least one access point, the at least one access point constituting an interface between the first nodes of the first wireless network and the third wireless network such that the at least one access point can route, via the MR/BR node, communications addressed to at least one second node in the second wireless network whose unique second address is registered with the MR/BR node.

17. The at least one non-transitory computer readable medium of claim 15, wherein the instructions further cause the processor to:

allow each first node downstream of the MR/BR node to register a respectively unique first address of that first node with the MR/BR node; and register the respectively unique first address of each first node with at least one other border router node such that the at least one other border router node can route, via the MR/BR node, communications addressed to at least one first node in the first wireless network whose unique first address is registered with the MR/BR node.

18. The at least one non-transitory computer readable medium of claim 15, wherein the instructions further cause the processor to:

receive, via the first address of the MR/BR node, the first communication in the first wireless network from at least one access point, the at least one access point constituting an interface between the first nodes of the first wireless network and the third wireless network; and transmit the received first communication to at least one of the second nodes in the second wireless network.

19. The at least one non-transitory computer readable medium of claim 15, wherein the instructions further cause the processor to:

receive, via the first address of the MR/BR node, the first communication in the first wireless network from at least one other first node in the first wireless network downstream of the MR/BR node; and transmit the received first communication to at least one of the second nodes in the second wireless network.

20. The at least one non-transitory computer readable medium of claim 15, wherein the instructions further cause the processor to:

receive, via the second address of the MR/BR node, the second communication in the second wireless network from at least one other border router node; and transmit the received second communication to at least one of the first nodes in the first wireless network.

21. The at least one non-transitory computer readable medium of claim 15, wherein the instructions further cause the processor to:

receive, via the second address of the MR/BR node, the second communication in the second wireless network from at least one second node in the second wireless network downstream of the MR/BR node; and transmit the received second communication to at least one of the first nodes in the first wireless network.

* * * * *